United States Patent
Li et al.

(10) Patent No.: US 9,935,741 B2
(45) Date of Patent: *Apr. 3, 2018

(54) PROVIDING ACKNOWLEDGEMENT INFORMATION BY A WIRELESS DEVICE

(71) Applicant: Apple Inc., Cupertino, CA (US)

(72) Inventors: Jun Li, Richardson, TX (US); Lai King Tee, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,840

(22) Filed: Jan. 30, 2017

(65) Prior Publication Data

US 2017/0141881 A1    May 18, 2017

Related U.S. Application Data

(63) Continuation of application No. 14/883,800, filed on Oct. 15, 2015, now Pat. No. 9,571,233, which is a continuation of application No. 14/242,101, filed on Apr. 1, 2014, now Pat. No. 9,191,161, which is a continuation of application No. 13/124,617, filed as application No. PCT/US2009/063264 on Nov. 4, 2009, now Pat. No. 9,083,522.

(Continued)

(51) Int. Cl.
*H04L 1/16* (2006.01)
*H04W 72/04* (2009.01)
*H04L 1/18* (2006.01)
*H04W 28/04* (2009.01)

(52) U.S. Cl.
CPC .......... *H04L 1/1635* (2013.01); *H04L 1/1858* (2013.01); *H04W 72/0406* (2013.01); *H04W 28/04* (2013.01)

(58) Field of Classification Search
None
See application file for complete search history.

(56) References Cited

U.S. PATENT DOCUMENTS

| 6,931,569 | B2 | 8/2005 | Fong et al. |
| 7,414,989 | B2 | 8/2008 | Kuchibhotla et al. |

(Continued)

FOREIGN PATENT DOCUMENTS

| KR | 10-2007-0020027 | 2/2007 |
| WO | 2005119959 | 12/2005 |
| WO | 2008028006 | 3/2008 |

OTHER PUBLICATIONS

Office Action for Chinese Patent Application No. 201410482348.9, dated Mar. 28, 2017, pp. 1-8.

(Continued)

*Primary Examiner* — Eunsook Choi
(74) *Attorney, Agent, or Firm* — Meyertons, Hood, Kivlin, Kowert & Goetzel, P.C.

(57) ABSTRACT

In general, to provide acknowledgment information by a first wireless device, the first wireless device sends repeated instances of acknowledgment information in respective first and second frame structures, in response to receipt of first information from a second wireless device. In addition, the first wireless device also sends further acknowledgment information in the second frame structure that is responsive to second information received from the second wireless device.

21 Claims, 3 Drawing Sheets

Related U.S. Application Data

(60) Provisional application No. 61/111,126, filed on Nov. 4, 2008.

(56) References Cited

U.S. PATENT DOCUMENTS

| | | | |
|---|---|---|---|
| 7,898,244 | B2 | 3/2011 | Taylor et al. |
| 8,432,875 | B2 | 4/2013 | Dai et al. |
| 2002/0168945 | A1 | 11/2002 | Hwang et al. |
| 2007/0024559 | A1 | 2/2007 | Ahu et al. |
| 2007/0162810 | A1 | 7/2007 | Sato et al. |
| 2007/0254662 | A1* | 11/2007 | Khan ............... H04L 1/1685 455/436 |
| 2007/0286146 | A1 | 12/2007 | Kuroda et al. |
| 2008/0095109 | A1 | 4/2008 | Malladi et al. |
| 2008/0209301 | A1 | 8/2008 | Chang et al. |
| 2009/0046649 | A1* | 2/2009 | Gao ............... H04L 1/1861 370/329 |
| 2009/0055703 | A1* | 2/2009 | Kim ............... H04J 11/00 714/748 |
| 2009/0110038 | A1 | 4/2009 | Monlojo et al. |
| 2009/0207793 | A1 | 8/2009 | Shen et al. |
| 2009/0213769 | A1* | 8/2009 | Shen ............... H04W 72/14 370/280 |
| 2011/0164662 | A1 | 7/2011 | Kishiyama et al. |
| 2012/0201327 | A1 | 8/2012 | Kim et al. |

OTHER PUBLICATIONS

Office Action. Korean Patent Application No. 10-2011-7012377, dated Jul. 20, 2015. 17 pages.
LGE, Nokia, NSN, Panasonic, Ericsson, TI and Samsung, Correction of PUCCH index generation formula [online], 3GPP TSG-RAN WG1#53b R1-082715, Internet <URL: http://www.3gpp.org/ftptsg_ran/WG1_RL 1/TSGR1_53b/Docs/R1082715.zip, Jul. 2008 (presenting well-known technique), (Note) Due to legal or contractual restrictions, etc., a part or all of the presented Non-Patent Documents may not be served.
Office Action, Japan Application No. 2014-184206, dated Jun. 29, 2015, 6 pages.
Office Action from Canadian Application No. 2742800, dated Dec. 23, 2014, pp. 1-5.
Office Action from Japanese Patent Application No. 2011-534899, dated Oct. 24. 2013. (English and Japanese Versions), pp. 1-11.
Texas Instruments, ACKINAK Repetition in EUTRA Uplink[online], 3GPP, TSG-RAN WG1#53 R1-081981, Internet <URL:http://www.3gpp.org/ftp/tsg_ran/WG1_RL 1/TSGR1_53/Docs/R1-081981.zip>, May 5-9, 2008, pp. 1-2.
Motorola, Uplink ACKINACK Repetition [online], 3GPP TSG-RAN WG1#53b R1-082474, Internet <URL: http:!fwww.3gpp.org/ftp/tsg_ran/WG1_RL 1/TSGR1_53b/Docs/R1-082474.zip>, Jun. 29-Jul. 4 ,2011, pp. 1-4.
Texas Instruments, Nokia Siemens Networks, Nokia, LGE, Samsung, ZTE, Way forward on support of ACKINAK repetition[online], 3GPP TSG-RAN WG1#53b R1-082739, Internet <URL: http://www.3gpp.org/ftp/tsg_ran/WG1_RL 1/TSGR1_53b/Docs/R1-082739.zip>, Jun. 30-Jul. 4, 2011, pp. 1-4.
First Office Action and translation thereof in Chinese Patent Application No. 200980144239.3, dated May 6, 2013, pp. 1-13.
International Search Report and Written Opinion dated Jun. 11, 2010 for International Application No. PCT/US2009/063264, International Filing Date: Nov. 4, 2009 consisting of 10-pages.
U.S. Appl. No. 61/111,126, filed Apr. 15, 2011, Jun Li.
Notice of Allowance, Korean Patent Application No. 10-2011-70123 77, dated Jan. 28, 2016, 7 pages.
Office Action, Japanese Application No. 2014-184206, dated Dec. 28, 2015, 6 pages.
Texas Instruments, ACKINAK Repetition in EUTRA Uplink[online], 3GPP, TSG-RAN WG1#53 RI-081981, Internet <URL:http://www.3gpp.org/ftp/tsg_ran/WG1_RLI/TSGRI_53/Docs/R1-081981.zip>, May 5-9, 2008, pp. I-2.
Motorola, Uplink ACKINACK Repetition [online], 3GPP TSGRAN WG1 #53b RI-082474, Internet <URL: http!fwww.3gpp.org/ftp/tsg_ran/WG1_RL 1/TSGR1_53b/Doc RI-082474.zip>, Jun. 29-Jul. 4, 2011 , pp. 1-4.
3GPP TSG RAN WG1 #54bis; RI-083527; Way Forward on Support of ACK/NAK Repetition; Prague, Czech Republic, Sep. 29-Oct. 3, 2008; Texas Instruments, LGE, Samsung, ZTE; pp. 14.
3GPP TSG RAN WG1 #54bis; RI-084046; Way Forward on Support of ACK/NAK Repetition; Prague, Czech Republic, Sep. 29-Oct. 3, 2008; Texas Instruments, LGE, Samsung, Motorola., ZTE, NTT DoCoMo, RIM, CMCC, CATT; pp. 1-4.
Office Action for Indian Patent Application No. 2622/CHENP/2011, dated Aug. 22, 2017 pp. 1-6.

* cited by examiner

PROVIDING ACKNOWLEDGEMENT INFORMATION BY A WIRELESS DEVICE

CROSS-REFERENCE TO RELATED APPLICATIONS

This application is a continuation of U.S. patent application Ser. No. 14/883,800, filed Oct. 15, 2015, entitled "PROVIDING ACKNOWLEDGEMENT INFORMATION BY A WIRELESS DEVICE", which is a continuation of U.S. patent application Ser. No. 14/242,101, filed Apr. 1, 2014, of the same title, now U.S. Pat. No. 9,191,161, which is a continuation of U.S. patent application Ser. No. 13/124,617, filed Apr. 15, 2011, of the same title, now U.S. Pat. No. 9,083,522, which is a Submission Under 35 U.S.C. § 371 for U.S. National Stage Patent Application of International Application No. PCT/US2009/063264, filed Nov. 4, 2009, of the same title, which claims priority to U.S. Provisional Application No. 61/111,126, filed Nov. 4, 2008, the entirety of which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) (also referred to as the Evolved Universal Terrestrial Radio Access (EUTRA) standard) from 3GPP, which seeks to enhance the UMTS technology.

In a wireless communications network, information is communicated wirelessly between mobile stations and base stations. In response to information received in the downlink (from base station to a mobile station), the mobile station can send acknowledgment information to either provide a positive acknowledge (ACK) of successful receipt of the data, or negative acknowledgment (NAK) to indicate that the data was not successfully received. To improve reliability, a recent development of LTE proposed use of ACK/NAK repetition, in which a mobile station repeats the sending of an ACK or NAK in response to downlink information from the base station, to improve the likelihood that the base station receives the ACK or NAK. This may be particularly useful when the mobile station is in a region of a cell or cell sector that has relatively poor wireless conditions, such as at the edge of the cell or cell sector, or in another location associated with obstructions that may result in reduced signal strength or increased noise.

An issue associated with repetition of ACK/NAK is that in response to consecutively received pieces of downlink information, the acknowledgment information for such consecutively received pieces of information may collide, which may cause the base station to not reliably receive the acknowledgment information associated with the consecutively transmitted pieces of downlink information.

SUMMARY

In general, according to a preferred embodiment, a method of providing acknowledgment information by a first wireless device comprises the first wireless device sending repeated instances of acknowledgment information in respective first and second frame structures, in response to receipt of first information from a second wireless device. In addition, the first wireless device also sends further acknowledgment information in the second frame structure that is responsive to second information received from the second wireless device.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
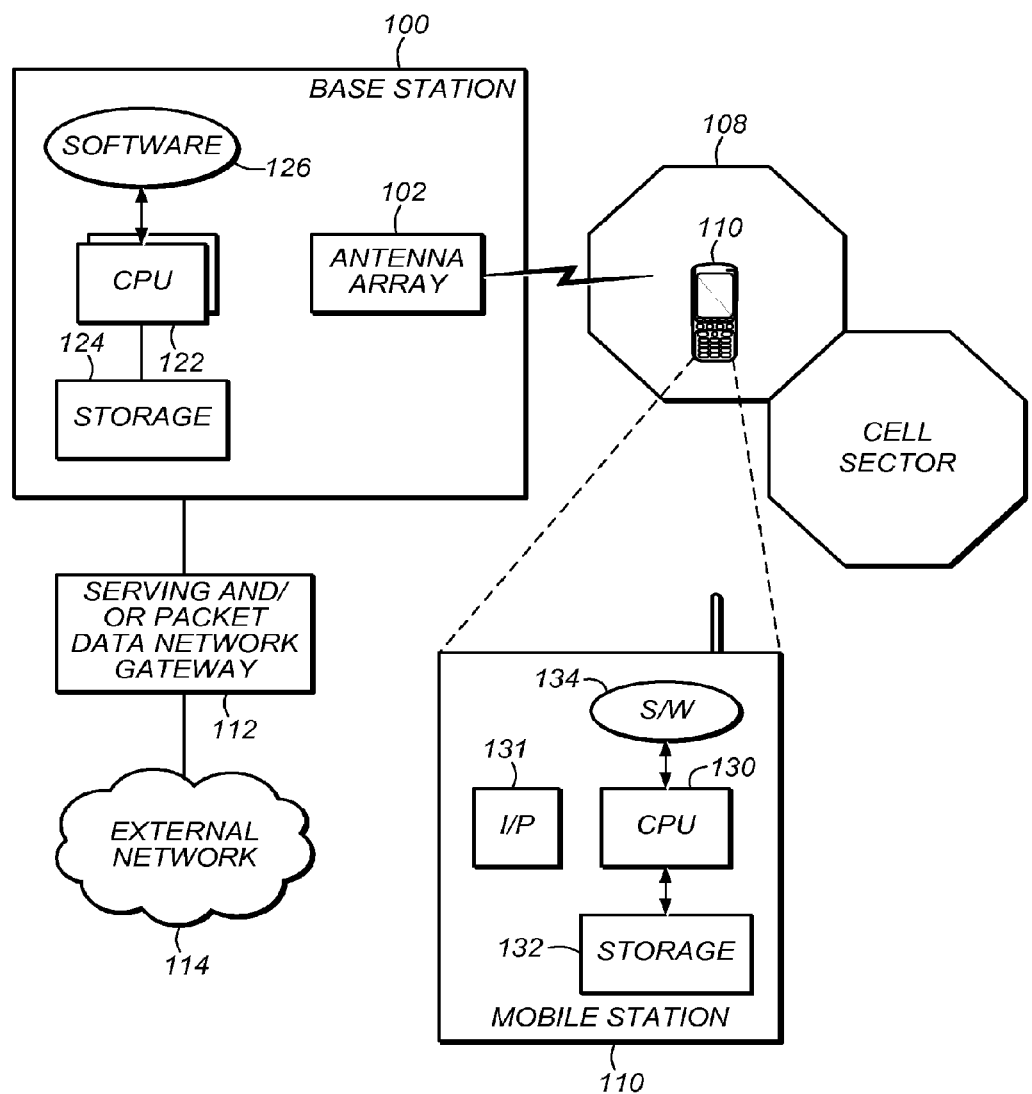
FIG. 1 is a block diagram of an example arrangement that includes a wireless communications network that incorporates some preferred embodiments of the invention.

In accordance with some preferred embodiments, a technique or mechanism is provided to allow for transmission of repeated instances of acknowledgment information while avoiding the issue of collisions in acknowledgment information sent in response to multiple pieces of received information. In some embodiments, the acknowledgment information is sent by a mobile station in the uplink (from the mobile station to the base station) in response to receipt of downlink data from the base station. The acknowledgment information includes either a positive acknowledgment (ACK) to indicate successful receipt of the data, or a negative acknowledgment (NAK) to indicate unsuccessful receipt of the data.

To improve reliability under certain conditions, the mobile station can be configured to perform ACK/NAK repetition, in which multiple instances of the ACK/NAK information is sent in response to receipt of a particular piece of downlink data. In some implementations, the number of ACK/NAK repetitions configured in the mobile station can be two. In other implementations, the mobile station can be configured to send three or four or more instances of the ACK/NAK information (number of ACK/NAK repetitions is three or four or more). ACK/NAK repetition is useful when the mobile station is located in a region of a cell or cell sector that is associated with unreliable wireless signaling. For example, the mobile station may be located at the edge of the cell or cell sector, or the mobile station may be located in a region with obstructions that reduce signal strength or increase noise.

An issue associated with performing ACK/NAK repetition is the likelihood of collisions of ACK/NAK information when the mobile station sends respective repeated ACK/NAKs in response to consecutively received pieces of downlink data. In accordance with some embodiments, to eliminate or reduce the likelihood of collisions of ACK/NAK information, the repeated instance of an ACK/NAK may be communicated in a format that allows for multiple ACK/NAKs (that are responsive to different pieces of downlink data) to be transmitted together. Thus, this predefined format allows for the repeated ACK/NAK responsive to a first piece of data to be sent by the mobile station together with the first ACK/NAK responsive to a second piece of downlink data.

In some embodiments, the wireless communications network is according to the Long Term Evolution (LTE) standard from 3GPP (Third Generation Partnership Project), which is an enhancement of the UMTS (Universal Mobile Telecommunications System) wireless technology. The LTE standard is also referred to as the EUTRA (Evolved Universal Terrestrial Radio Access) standard. Reference to an LTE (or EUTRA) wireless communications network refers to the wireless communications network that conforms to the requirements of the LTE (or EUTRA) standard developed by 3GPP, as that standard currently exists or as the standard evolves over time. Note that LTE (or EUTRA) can refer to the current LTE (or EUTRA) standard, or to modifications of the LTE (or EUTRA) standard that are made over time. It is expected that in the future a standard that has evolved from LTE (or EUTRA) may be referred to by another name. It is contemplated that the term "LTE" or "EUTRA" as used herein is intended to cover such future standards as well. In alternative embodiments, wireless communications networks according to other standards can be employed.

Although reference has been made to transmitting repeated uplink ACK/NAKs in response to downlink data, it is noted that other preferred embodiments of the invention can be applied to scenarios in which a base station transmits a downlink ACK/NAKs in response to uplink data from the mobile station. Moreover, although reference is made to sending ACK/NAK in response to received data, it is noted that ACK/NAK can also be sent in response to control signaling.

FIG. 1 shows an example wireless network in which some embodiments of the invention can be provided. The wireless network includes a base station 100 that includes an antenna array or other antenna assembly 102 for sending wireless signals into a cell sector 108. A cell sector is one section of a cell of a cellular network. In alternative implementations, element 108 can represent an entire cell. More generally, a "cell segment" refers to either a cell or a cell sector.

Although just one base station is depicted in FIG. 1, it is noted that a wireless network would typically include multiple base stations. In some embodiments, the wireless network is an LTE wireless network.

In an LTE wireless network, the base station 100 is an enhanced node B ("eNode B"), which includes a base transceiver station that includes the antenna array 102. The base station 100 may also include a radio network controller that cooperates with the enhanced node B. The radio network controller and/or enhanced node B can perform one or more of the following tasks: radio resource management, mobility management for managing mobility of mobile stations, routing of traffic, and so forth. Note that one radio network controller can access multiple eNode Bs, or alternatively, an eNode B can be accessed by more than one radio access controller.

More generally, the term "base station" can refer to a cellular network base station, an access point used in any type of wireless network, or any type of wireless transmitter to communicate with mobile stations.

As depicted in FIG. 1, the base station 100 includes one or more central processing units (CPUs) 122, which is (are) connected to storage 124. Moreover, the base station 100 includes software 126 that is executable on the CPU(s) 122 to perform tasks of the base station 100.

The mobile station 110 of FIG. 1 also includes one or more CPUs 130 that are connected to storage 132. The mobile station 110 also includes software 134 that is executable on the CPU(s) 130 to perform tasks of the mobile station 110. In addition, the mobile station 110 includes an interface 131 to communicate wirelessly with the base station 100.

The base station 100 is connected to a serving and/or packet data network (PDN) gateway 112, which terminates the user plane interface toward the enhanced node B and assumes the responsibility for packet routing and transfer towards an external network 114, which can be a packet data network such as the Internet or other types of network.

The arrangement depicted in FIG. 1 is provided for purposes of example. In other implementations, other wireless network arrangements are used.

In accordance with some embodiments, downlink data in an LTE wireless communications network is transmitted in PDSCH (physical downlink shared channel) subframes. The PDSCH is a traffic channel. In other implementations, the downlink data can be transmitted in other downlink traffic channels. An LTE subframe is a portion of an LTE frame. An LTE frame has a predefined overall time length that is divided into a predefined number of time slots. An LTE frame is made up of multiple subframes, where an LTE subframe can include some predefined number of the slots (e.g., two slots) of the LTE frame.

In response to receiving downlink data in a PDSCH subframe, the mobile station transmits acknowledgment information (ACK/NAK) to indicate successful or unsuccessful receipt of the downlink data in the PDSCH subframe. In some embodiments, the ACK/NAK is sent by the mobile station in the uplink direction in a PUCCH (physical uplink control channel) subframe. More generally, the repeated instances of ACK/NAK are sent in consecutive frame structures, where a "frame structure" can include a subframe or some other frame structure.

As noted above, ACK/NAK repetition can be enabled for at least one mobile station that the base station 100 is communicating with. If the mobile station is configured to perform ACK/NAK repetition by sending two repeated instances of the ACK/NAK, then the mobile station will respond to a downlink PDSCH subframe by sending two repeated instances of ACK/NAK in consecutive PUCCH subframes. For example, as shown in FIG. 2, in response to downlink data_1 received in PDSCH subframe n, a mobile station configured to perform ACK/NAK repetition will send two instances of ACK/NAK (each instance represented as ACK/NAK_1) in consecutive PUCCH subframes n+4 and n+5.

Figure 2:
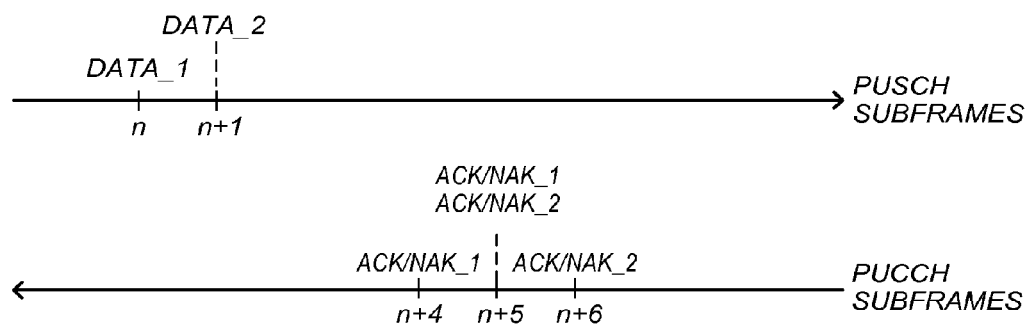
FIGS. 2 and 3 illustrate the sending of downlink data and responsive repeated instances of acknowledgment information in accordance with some preferred embodiments.

FIG. 2 also indicates that another piece of downlink data (data_2) is scheduled to be transmitted to the same mobile station in the next consecutive PDSCH subframe (n+1). Since the mobile station is configured to perform ACK/NAK repetition, the mobile station will send two repeated instances of ACK/NAK_2 in consecutive PUCCH subframes (n+5, n+6).

Note that in this example, one instance of ACK/NAK_1 and one instance of ACK/NAK_2 are scheduled to be transmitted in the same PUCCH subframe (n+5). If not properly handled, ACK/NAK_1 will collide with ACK/NAK_2 in PUCCH subframe n+5.

To address this issue, in accordance with some embodiments, ACK/NAK_1 and ACK/NAK_2 are transmitted together in PUCCH subframe n+5 using a predefined format that allows for communication of multiple different pieces of ACK/NAK information. In some embodiments, an ACK/

NAK is communicated as a single bit, where the bit having a first value (e.g., "1") represents ACK, and the bit having a second value (e.g., "0") represents NAK. In such embodiments, sending two pieces of ACK/NAK information refers to sending two information bits in the PUCCH subframe (e.g., ACK/NAK_1 is sent in a first bit, while ACK/NAK_2 is sent in a second bit).

In one example implementation, the predefined format that allows for transmission of multiple different ACK/NAK bits in the same PUCCH subframe is referred to as format 1b. Format 1b differs from a different PUCCH format 1a, in which only a single ACK/NAK bit is allowed in the PUCCH subframe. In the example of FIG. 2, ACK/NAK_1 sent in PUCCH subframe n+4 is according to format 1a, and ACK/NAK_2 in PUCCH subframe n+6 is also according to format 1a. However, ACK/NAK_1 and ACK/NAK_2 in PUCCH subframe n+5 are sent together according to format 1b. In one implementation, the two ACK/NAK bits are transmitted together using QPSK (quadrature phase-shift keying) modulation.

The ability to use different formats for communicating acknowledgment information allows for greater flexibility in performing ACK/NAK repetition, while avoiding or reducing the likelihood of ACK/NAK collisions.

Figure 3:
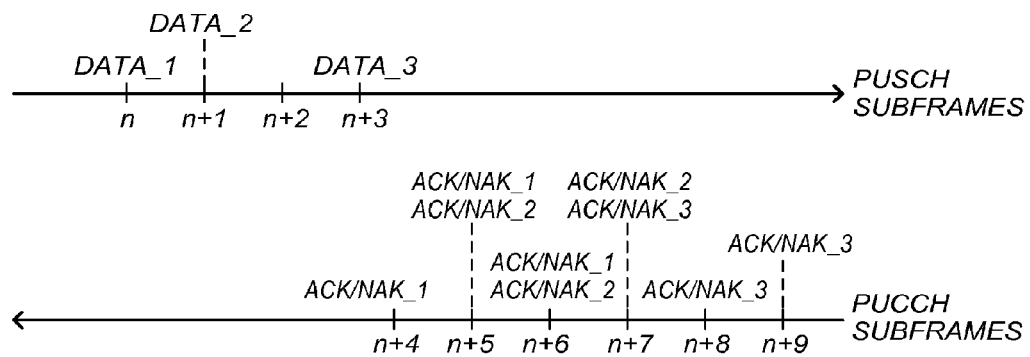

FIG. 3 shows another example in which the ACK/NAK repetition is set at 3 (in other words three instances of ACK/NAK is sent by the mobile station in response to downlink data in a particular PDSCH subframe). When the ACK/NAK repetition is set at 3, data for the same mobile station cannot be sent in the downlink direction in more than two consecutive PDSCH subframes. Data for the same mobile station can be sent in two consecutive PDSCH subframes, followed by an intermediate subframe period that does not contain downlink data for the mobile station, then followed by another PDSCH subframe that contains data for the same mobile station. In the example of FIG. 3, data_1, data_2, and data_3 are sent in three different PDSCH subframes to the same mobile station. Data _1 is sent in PDSCH subframe n data_2 is sent in PDSCH subframe n+1, and data_3 is sent in PDSCH subframe n+3, where intermediate subframe n+2 (which does not contain downlink data for the mobile station) is provided to separate the transmission of data_2 and data_3. Downlink data can be scheduled to the same mobile station every two consecutive PDSCH subframes. However, after the two consecutive subframes, a separation subframe has to be provided before another PDSCH subframe can be sent to the same mobile station.

As further shown in FIG. 3, ACK/NAK_1 for data _1 is sent as three repeated instances in consecutive PUCCH subframes n+4, n+5, and n+6. The three repeated instances of ACK/NAK_2 (responsive to data_2) are sent in PUCCH subframes n+5, n+6, and n+7. Note that PUCCH in subframe n+5 and n+6 each contains both ACK/NAK_1 and ACK/NAK_2. No data for the mobile station is sent in PDSCH subframe n+2, since doing so would require an ACK/NAK in PUCCH subframe n+6 which already is sending two other ACK/NAK bits. Thus, a separation PDSCH subframe is provided between data_2 and data_3, such that ACK/NAK_3 starts in PUCCH subframe n+7 rather than PUCCH subframe n+6.

Figure 4:
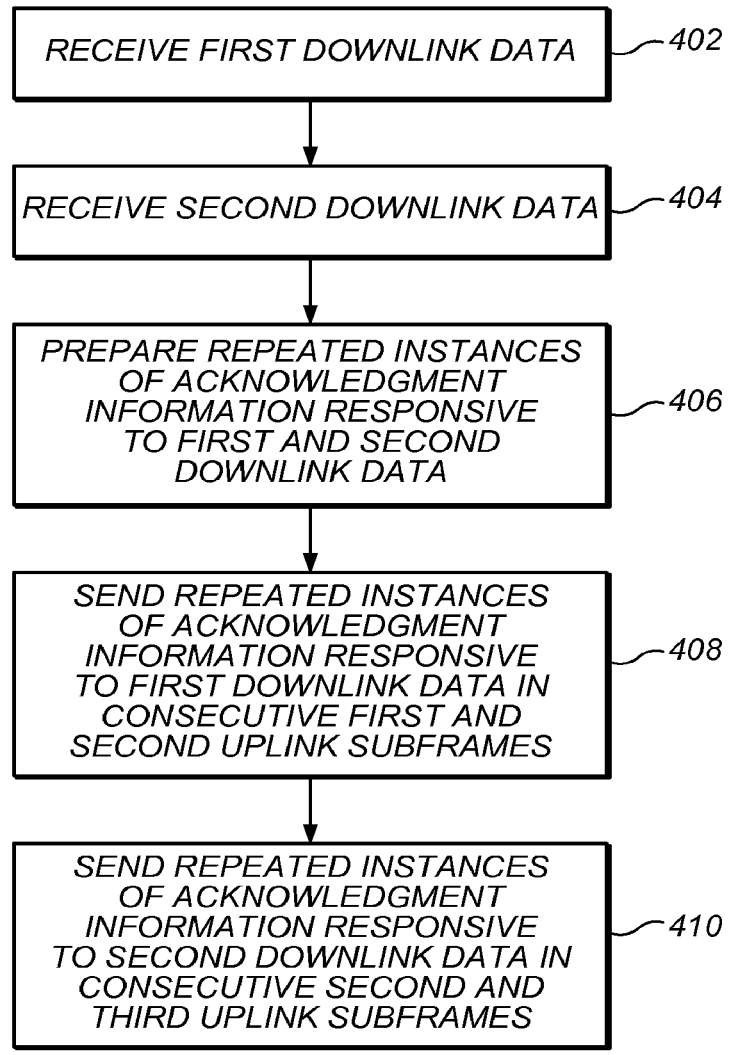
FIG. 4 is a flow diagram of a process of sending acknowledgment information, according to an embodiment.

FIG. 4 is a flow diagram of a process according to an embodiment that is performed at the mobile station 110, which is assumed to be configured to perform ACK/NAK repetition. First downlink data is received (at 402) in a downlink channel subframe, such as a PDSCH subframe. Second downlink data is received (at 404) in another PDSCH subframe, which can be consecutive to the PDSCH subframe containing the first downlink data. In response to the first and second downlink data, the mobile station prepares (at 406) the repeated instances of acknowledgment information responsive to the first and second downlink data. It is assumed that the mobile station is configured to send two repeated instances in response to each piece of downlink data.

The mobile station sends (at 408) the two repeated instances of acknowledgment information responsive to the first downlink data in first and second consecutive uplink control channel (e.g., PUCCH) subframes. The first uplink control channel is at some offset from the downlink subframe carrying the first downlink data. The mobile station sends repeated instances of the acknowledgment information responsive to the second downlink data in second and third consecutive uplink control channel subframes (at 410).

Although reference is made to the mobile station performing the process of FIG. 4, it is noted that the base station can also be configured to perform the process of FIG. 4, where the base station is to acknowledge receipt of uplink information data (and/or signaling) from a mobile station.

In an alternative embodiment, it is contemplated that the mobile station can use a scheduled PUSCH (physical uplink shared channel) to send a repeated instance of ACK/NAK. Thus, for example, referring back to FIG. 2, if a PUSCH is scheduled to be sent in subframe n+5, then the ACK/NAK_1 that was supposed to have been sent in PUCCH subframe n+5 can instead be sent in PUSCH subframe n+5. The second repeated ACK/NAK_1 instance can be multiplexed with data on the PUSCH, according to the LTE standard.

As yet another alternative, if a PUSCH transmission was scheduled for subframe n+5, this PUSCH transmission can be skipped to avoid collision with the ACK/NAK scheduled to be sent in PUCCH subframe n+5.

The ACK/NAK repetition of a given mobile station is configurable by the base station. For example, the base station can send a parameter to the mobile station to specify the number of repetitions (2, 3, 4, or more). The mobile station-specific ACK/NAK repetition parameter can be configured by using RRC (radio resource control) signaling or other type of control signaling.

Instructions of software described above (including software 126 and 130 of FIG. 1) are loaded for execution on a processor (such as one or more CPUs 122 and 130 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An apparatus comprising:
    a memory; and
    at least one processing unit in communication with the memory, wherein the at least one processing unit and memory are configured to:
        receive a configuration for acknowledgment information transmission repetition, wherein the configuration includes a value for a number of transmission repetitions for acknowledgement information, and wherein acknowledgement information corresponding to downlink transmissions is to be repeated on consecutive uplink subframes according to the configuration for acknowledgment information transmission repetition;
        receive first and second scheduled transmissions from a second wireless device on respective first and second downlink subframes, wherein each of the first and second scheduled transmissions use single spatial layer transmission;
        prepare acknowledgement information for the first and second scheduled transmissions based on the configuration for acknowledgment information transmission repetition;
        determine transmission of acknowledgement information for any further downlink transmissions cannot occur while the transmission of acknowledgement information for any further downlink transmissions would collide with ongoing repetitions of acknowledgement information for both of the first and second scheduled transmissions; and
        transmit the acknowledgement information for the first scheduled transmission together with the acknowledgement information for the second scheduled transmission in a first uplink subframe in a single message, wherein the first uplink subframe is subsequent to receiving the first and second scheduled transmissions.

2. The apparatus of claim 1,
    wherein the single message comprises a first single message, and wherein the at least one processing unit and memory are further configured to transmit a repetition of the acknowledgement information for the first scheduled transmission together with the acknowledgement information for the second scheduled transmission in a second uplink subframe in a second single message.

3. The apparatus of claim 1,
    wherein the first and second downlink subframes are consecutive downlink subframes.

4. The apparatus of claim 1,
    wherein to determine that transmission of acknowledgement information for any further downlink transmissions cannot occur, the at least one processing unit and memory are further configured to:
        determine a downlink transmission will not be scheduled in a third consecutive downlink subframe.

5. The apparatus of claim 1,
    wherein the at least one processing unit and memory are further configured to:
        determine repetitions of acknowledgement information for at least one of the first and second scheduled transmissions will not occur in a second uplink subframe; and
    determine the apparatus is capable of being scheduled for downlink transmission in a third downlink subframe, wherein a corresponding acknowledgement information transmission will occur in the second uplink subframe.

6. The apparatus of claim 1,
    wherein, to transmit the acknowledgement information for the first scheduled transmission together with the acknowledgement information for the second scheduled transmission, the at least one processing unit and memory are further configured to:
        transmit at least one bit indicating positive acknowledgement or negative acknowledgement.

7. The apparatus of claim 1,
    wherein the at least one processing unit and memory are further configured to:
        determine an occurrence of a semi-persistently scheduled transmission on an uplink traffic channel in the first uplink subframe, wherein at least one processing unit and memory are further configured to multiplex uplink traffic and acknowledgement information on the uplink traffic channel in absence of a repetition of acknowledgement information;
        skip transmission of the semi persistently scheduled transmission on the uplink traffic channel in the first uplink subframe based on receiving the configuration for acknowledgement information transmission repetition and prepare acknowledgement information for the first and second scheduled transmissions;
    wherein to transmit the acknowledgement information he at least one processing unit and memory are further configured to use the uplink control channel, different from the uplink traffic channel.

8. The apparatus of claim 1,
    wherein the configuration is received in a radio resource control message and specifies a wireless device-specific number of repetitions of acknowledgement information.

9. A wireless device comprising:
    an interface; and
    a processor coupled to the interface, wherein the interface and the processor are configured to:
        receive a configuration for acknowledgment information transmission repetition, wherein the configuration includes a value for a number of transmission repetitions for acknowledgement information, and wherein acknowledgement information corresponding to downlink transmissions is to be repeated on consecutive uplink subframes according to the configuration;
        receive first and second scheduled transmissions from a second wireless device on respective first and second downlink subframes, wherein each of the first and second scheduled transmissions use single spatial layer transmission;

prepare acknowledgement information for the first and second scheduled transmissions based on the configuration for acknowledgment information transmission repetition;

determine transmission of acknowledgement information for any further downlink transmissions cannot occur while repetitions of acknowledgement information for both of the first and second scheduled transmissions are ongoing; and transmit the acknowledgement information for the first scheduled transmission together with the acknowledgement information for the second scheduled transmission in a first uplink subframe in a single message, wherein the first uplink subframe is subsequent to receiving the first and second scheduled transmissions.

10. The wireless device of claim 9,
wherein the single message comprises a first single message, and wherein the interface and the processor are further configured to transmit a repetition of the acknowledgement information for the first scheduled transmission together with the acknowledgement information for the second scheduled transmission in a second uplink subframe in a second single message.

11. The wireless device of claim 9,
wherein the first and second downlink subframes are consecutive downlink subframes.

12. The wireless device of claim 9,
wherein to determine that transmission of acknowledgement information for any further downlink transmissions cannot occur, the interface and the processor are further configured to:
determine that a downlink transmission will not be scheduled in a third consecutive downlink subframe.

13. The wireless device of claim 9,
wherein, to transmit the acknowledgement information for the first scheduled transmission together with the acknowledgement information for the second scheduled transmission, the interface and the processor are further configured to:
transmit at least one bit indicating positive acknowledgement or negative acknowledgement.

14. The wireless device of claim 9,
wherein the interface and the processor are further configured to:
determine an occurrence of a semi-persistently scheduled transmission on an uplink traffic channel in the first uplink subframe, wherein at least one processing unit and memory are further configured to multiplex uplink traffic and acknowledgement information on the uplink traffic channel in absence of a repetition of acknowledgement information;
skip transmission of the semi persistently scheduled transmission on the uplink traffic channel in the first uplink subframe based on receiving the configuration for acknowledgement information transmission repetition and prepare acknowledgement information for the first and second scheduled transmissions;
wherein to transmit the acknowledgement information he at least one processing unit and memory are further configured to use the uplink control channel, different from the uplink traffic channel.

15. An apparatus comprising:
a memory; and
at least one processing unit in communication with the memory, wherein the at least one processing unit and memory are configured to:
transmit a configuration for acknowledgment information transmission repetition, wherein the configuration includes a value for a number of transmission repetitions for acknowledgement information, wherein the configuration instructs a second wireless device to repeat acknowledgement information corresponding to downlink transmissions on consecutive uplink subframes according to the configuration;
transmit first and second scheduled transmissions to a second wireless device on respective first and second downlink subframes, wherein each of the first and second scheduled transmissions use single spatial layer transmission;
determine a third transmission will not be scheduled on at least a third downlink subframe based on a determined collision in a corresponding future uplink subframe between a first transmission of acknowledgement information for the third scheduled transmission and a repetition of acknowledgement information for the first and second scheduled transmissions; and
receive the acknowledgement information for the first scheduled transmission together with the acknowledgement information for the second scheduled transmission in a first uplink subframe in a single message, wherein the first uplink subframe is subsequent to receiving the first and second scheduled transmissions.

16. The apparatus of claim 15,
wherein the single message comprises a first single message, and wherein the at least one processing unit and memory are further configured to:
receive a repetition of the acknowledgement information for the first scheduled transmission together with the acknowledgement information for the second scheduled transmission in a second uplink subframe in a second single message.

17. The apparatus of claim 15,
wherein, to receive the acknowledgement information for the first scheduled transmission together with the acknowledgement information for the second scheduled transmission, the at least one processing unit and memory are further configured to:
receive at least one bit indicating positive acknowledgement or negative acknowledgement.

18. The apparatus of claim 15,
wherein, to receive the acknowledgement information for the first scheduled transmission together with the acknowledgement information for the second scheduled transmission, the at least one processing unit and memory are further configured to:
receive two bits within the first uplink subframe.

19. The apparatus of claim 15,
wherein, to receive the acknowledgement information for the first scheduled transmission together with the acknowledgement information for the second scheduled transmission, the at least one processing unit and memory are further configured to:
receive the acknowledgement information in a format that is different from a format used for receiving acknowledgement information for a single transmission.

20. The apparatus of claim 15,
wherein, to receive the acknowledgement information for the first scheduled transmission together with the acknowledgement information for the second scheduled transmission, the at least one processing unit and memory are further configured to:
  receive a first information bit of the uplink first subframe for the first scheduled transmission; and
  receive a second information bit of the uplink first subframe for the second scheduled transmission.

21. The apparatus of claim 15,
wherein the configuration is transmitted in a radio resource control message and specifies a wireless device-specific number of repetitions of acknowledgement information.

\* \* \* \* \*

UNITED STATES PATENT AND TRADEMARK OFFICE
CERTIFICATE OF CORRECTION

PATENT NO. : 9,935,741 B2  
APPLICATION NO. : 15/418840  
DATED : April 3, 2018  
INVENTOR(S) : Jun Li and Lai King Tee Page 1 of 1

It is certified that error appears in the above-identified patent and that said Letters Patent is hereby corrected as shown below:

In the Claims

Claim 14, Column 9, Line 64, please delete "wherein to transmit the acknowledgement information he" and substitute --wherein to transmit the acknowledgement information, the--.

Signed and Sealed this  
Fifth Day of May, 2020

Andrei Iancu  
*Director of the United States Patent and Trademark Office*